US010585532B2

(12) United States Patent
Kline et al.

(10) Patent No.: US 10,585,532 B2
(45) Date of Patent: Mar. 10, 2020

(54) OBSTRUCTION FREE SMARTWATCH INTERACTION

(71) Applicant: International Business Machines Corporation, Armonk, NY (US)

(72) Inventors: Eric V. Kline, Rochester, MN (US); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/935,904

(22) Filed: Mar. 26, 2018

(65) Prior Publication Data

US 2019/0294300 A1 Sep. 26, 2019

(51) Int. Cl.
*G06F 3/042* (2006.01)
*G06F 3/14* (2006.01)
*H04W 76/10* (2018.01)
*G06F 3/041* (2006.01)
G04G 21/02 (2010.01)
G04G 21/04 (2013.01)
G04G 21/08 (2010.01)

(52) U.S. Cl.
CPC .......... *G06F 3/0425* (2013.01); *G06F 3/0416* (2013.01); *G06F 3/1454* (2013.01); *H04W 76/10* (2018.02); G04G 21/02 (2013.01); G04G 21/04 (2013.01); G04G 21/08 (2013.01)

(58) Field of Classification Search
CPC ..... G06F 3/0425; G06F 3/0416; G06F 3/1454
See application file for complete search history.

(56) References Cited

U.S. PATENT DOCUMENTS

| 10,033,978 B1* | 7/2018 | Bostick | H04W 76/10 |
| 2007/0125633 A1 | 6/2007 | Boillot | |
| 2013/0285894 A1 | 10/2013 | Marti | |
| 2013/0322785 A1* | 12/2013 | Kamamori | G06F 3/0484 382/311 |

(Continued)

OTHER PUBLICATIONS

B. Clark, "New Samsung patent gives a glimpse at how we may interface with future smartwatches", INSIDER, Mary 13, 2016, p. 1-2.

(Continued)

*Primary Examiner* — Michael Pervan
(74) *Attorney, Agent, or Firm* — Cantor Colburn LLP; Tihon Poltavets (57) ABSTRACT

Embodiments include methods, systems, and computer program products method for obstruction free smartwatch interactions. The computer-implemented method includes pairing, using a processor, a smartwatch, and a companion device. The processor detects one or more obstructions to a display area of the smartwatch. The processor further determines that the one or more obstructions are caused by a user attempting to interact with the smartwatch. The method further projects content associated with the smartwatch onto a surface by the companion device in response to the one or more obstructions being caused by the user attempting to interact with the smartwatch. The method further receives a first input at the smartwatch via an interaction with the projected content associated with the smartwatch.

20 Claims, 5 Drawing Sheets

(56) References Cited

U.S. PATENT DOCUMENTS

2014/0225854 A1    8/2014  Ashikawa
2016/0127624 A1*  5/2016  Woo ................... H04N 9/3173
                                                  348/36

OTHER PUBLICATIONS

D. Riley, "Cicret Bracelet Could Make Other Smartwatches Redundant . . . If It's Real", Siliconangle, Blog, Dec. 2, 2014, p. 1-10.
White pages, "Samsung's next smartwatch may sport embedded projector", Deccan Chronicle, Technology, May 16, 2016, p. 1-5.

* cited by examiner

OBSTRUCTION FREE SMARTWATCH INTERACTION

BACKGROUND

The present invention relates in general to smart devices and more specifically, to interacting with a smart device display when obstructions are encountered.

A smartwatch is a mobile device, which typically includes a computer and a display that are packaged and attached to a bracelet. Smartwatches can often perform basic tasks, such as calculations, digital time telling, translations, and game playing. Newer versions of smartwatches can also run mobile applications (apps) using a mobile operating system and Bluetooth, Cellular, and Internet connectivity. Apps can allow smartwatches to function, for example, as schedulers, personal organizers, portable media players, social media interfaces, or the like.

SUMMARY

Embodiments of the invention are directed to a method for obstruction free smartwatch interactions. A non-limiting example of the computer-implemented method includes pairing, using a processor, a smartwatch, and a companion device. The processor detects one or more obstructions to a display area of the smartwatch. The processor further determines that the one or more obstructions are caused by a user attempting to interact with the smartwatch. The method further projects content associated with the smartwatch onto a surface by the companion device in response to the one or more obstructions being caused by the user attempting to interact with the smartwatch. The method further allows receives a first input at the smartwatch via an interaction with the projected content associated with the smartwatch.

Embodiments of the invention are directed to a computer program product that can include a storage medium readable by a processing circuit that can store instructions for execution by the processing circuit for performing a method for obstruction free smartwatch interactions. The method includes pairing a smartwatch and a companion device. The processor detects one or more obstructions to a display area of the smartwatch. The processor further determines that the one or more obstructions are caused by a user attempting to interact with the smartwatch. The method further projects content associated with the smartwatch onto a surface by the companion device in response to the one or more obstructions being caused by the user attempting to interact with the smartwatch. The method further receives a first input at the smartwatch via an interaction with the projected content associated with the smartwatch.

Embodiments of the invention are directed to a system. The system can include a processor in communication with one or more types of memory. The processor can be configured to pair a smartwatch and a companion device. The processor can be configured to detect one or more obstructions to a display area of the smartwatch. The processor can be configured to determine that the one or more obstructions are caused by a user attempting to interact with the smartwatch. The system can be configured to project content associated with the smartwatch onto a surface by the companion device in response to the one or more obstructions being caused by the user attempting to interact with the smartwatch. The system can be configured to receive a first input at the smartwatch via an interaction with the projected content associated with the smartwatch.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The forgoing and other features, and advantages of the disclosure are apparent from the following detailed description taken in conjunction with the accompanying drawings in which.

The diagrams depicted herein are illustrative. There can be many variations to the diagram or the operations described therein without departing from the spirit of the invention. For instance, the actions can be performed in a differing order or actions can be added, deleted, or modified. In addition, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments of the invention, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising,"

"includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that is more specifically relevant to aspects of the invention, embodiments of the invention are related in general to obstruction free smartwatch interactions. Use of smartwatches for various interactions with a digital world has risen. Unfortunately, user interactions with on the smartwatch can often be difficult due to the smartwatch having a small display area with poor resolution. Viewing the display area of the smartwatch can often be obstructed when the user needs to interact with a smartwatch, especially when the display area of the smartwatch is touch sensitive (i.e., the user using a finger to select desired one or more applications (apps) or other functions of the smartwatch. Moreover, when selecting the desired apps, the user can also obstruct display areas and/or smartwatch functionality incorporated into a band of the smartwatch. Accordingly, interacting with the smartwatch in the desired manner can be difficult because the user's view is obstructed leading to inefficient use of the smartwatch and general annoyance by the user.

Turning now to an overview of the aspects of the invention, one or more embodiments of the invention address the above-described shortcomings of the prior art by using sensors in a smartwatch to detect various gestures when interacting with a display of the smartwatch in response to the detected gestures. A wristband can be used to project the display area of the smartwatch on a display space. The projected display space creates a larger display area than the display area of the smartwatch thereby causing easier viewing and interaction. Accordingly, the user can interact with all portions of the smartwatch display area via the projected display space even when portions of the display area on smartwatch are obstructed by portions of the user's hand/fingers.

The above-described aspects of the invention address the shortcomings of the prior art by easing interactions with a smartwatch using a wristband connected to the smartwatch to project apps and other smartwatch functionality viewable on a display area of the smartwatch when at least a portion of the display area is obstructed by, for example, a user's hand/fingers. The user can more easily view interactions on the display area of the smartwatch through the projected display space or interact directly with the projected display space to control portions of the display area of the smartwatch. Aspects of the invention can also employ a camera and other sensors to detect when the display area of the smartwatch is obstructed.

Figure 1:
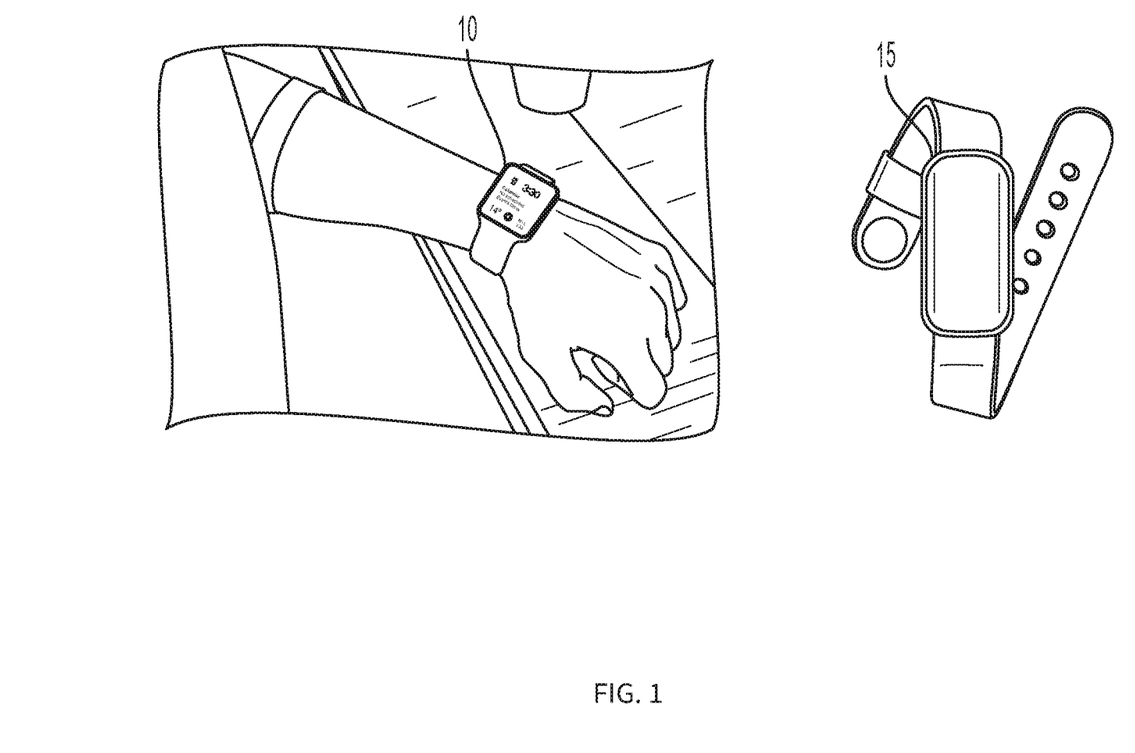
FIG. 1 depicts a block diagram of devices used to implement obstruction free smartwatch interactions according to one or more embodiments of the present invention.

Referring now to FIG. 1, an embodiment shows a smartwatch 10 and a companion device 15 which can be paired with the smartwatch 10. The pairing process can be a conventional Bluetooth pairing operation or any other communications protocol that can facilitate communications between the smartwatch 10 and companion device 15. The companion device 15 can be a pico-projector that can display at least a portion of a display area associated with the smartwatch 10. A pico-projector is a small hardware device designed to project content from, for example, a smartphone, camera, tablet, notebook or memory device onto a wall or surface. As illustrated, the smartwatch 10 can be worn on a wrist of a user. The companion device 15 can be worn on, for example, the opposing wrist of the user. The smartwatch 10 may include at least a computer, a display, one or more sensors and a camera.

As is described further below, the smartwatch 10 can be transmit signals to the companion device 15 that indicate the smartwatch 10 has encountered an obstruction blocking at least of portion of the display area of the smartwatch 10 thereby causing the companion device 15 to project data, applications, or any other functionality displayed within the display area of the smartwatch 10 in a display space output by the companion device 15. Accordingly, the user may view the obstructed portion of the display area within the projected display space while interacting with the display area of the smartwatch or interacting with the projected display space to control operations on the smartwatch 10.

Figure 2:
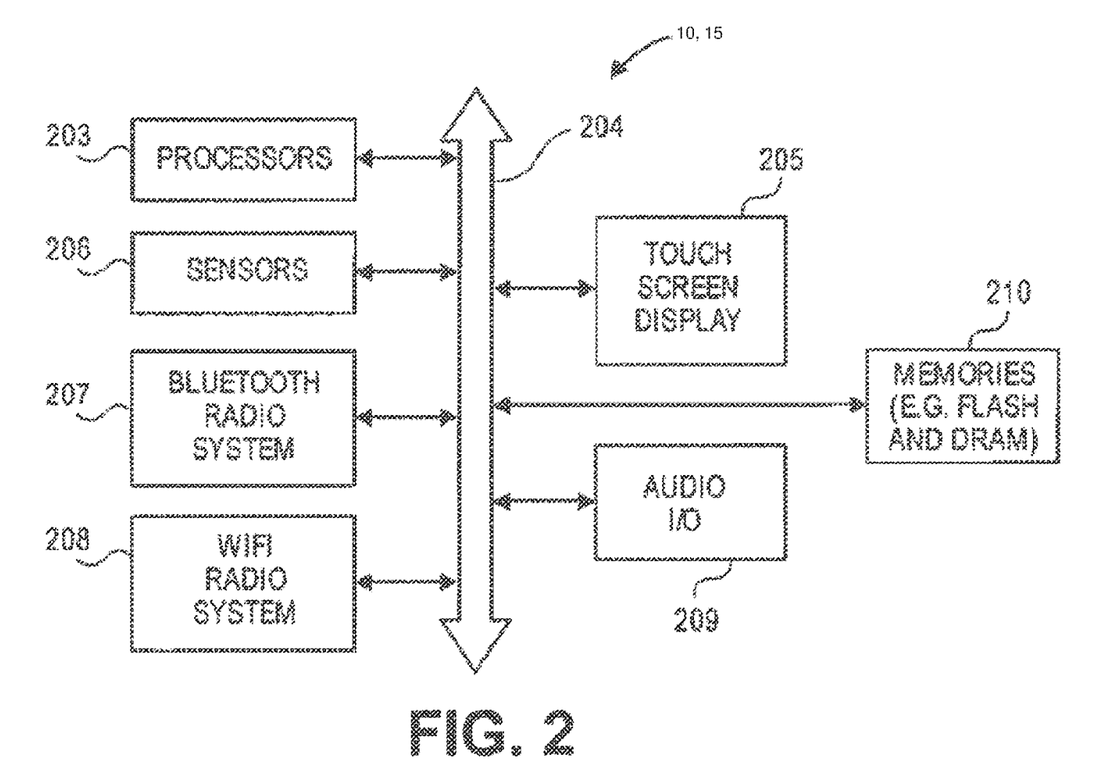
FIG. 2 depicts a block diagram of a computing environment according to one or more embodiments of the present invention.

FIG. 2 illustrates a block diagram of an exemplary computing environment for smartwatch 10 and companion device 15 according to one or more embodiments of the present invention. Smartwatch 10 and companion device 15 can include one or more processors 203, which are coupled through one or more buses 204 to other components of the smartwatch 10. Additional components of the smartwatch 10 can include one or more sensors 206, a touch screen display 205 which both displays images to the user and can receive touch inputs on the screen of the display. In addition, the smartwatch 10 and companion device 15 can include a Bluetooth radio system 207 and a WiFi radio system 208. The smartwatch 10 and companion device 15 can also include one or more memories 210 in which the one or more memories 210 can include flash memory, DRAM memory, and ROM memory. The one or more memories 210 can store camera and sensor data and can also store executable computer program instructions, which can cause the smartwatch 10 to operate as described herein.

In addition, the smartwatch 10 can include audio input/output 209 such as a microphone and one or more speakers 209. The sensors 206 can include one or more accelerometers, motion detectors, orientation detectors, gyroscopes, or other sensors, which can sense physical activity such as user interactions on the smartwatch 10, standing, moving, or exercising, etc. The sensors 206 can also include sensors that sense a proximity to a wrist or sense reflections from a wrist, such as LED based sensors that generate LED light and then sense reflected LED light that has been reflected by the wrist's skin. The sensors 206 can also include one or more of heart rate sensors, perspiration sensors or other sensors of a user's biological state. The smartwatch 10 can also include a camera (not shown) to capture gestures by a user when interacting with a display area of the smartwatch 10.

Figure 3:
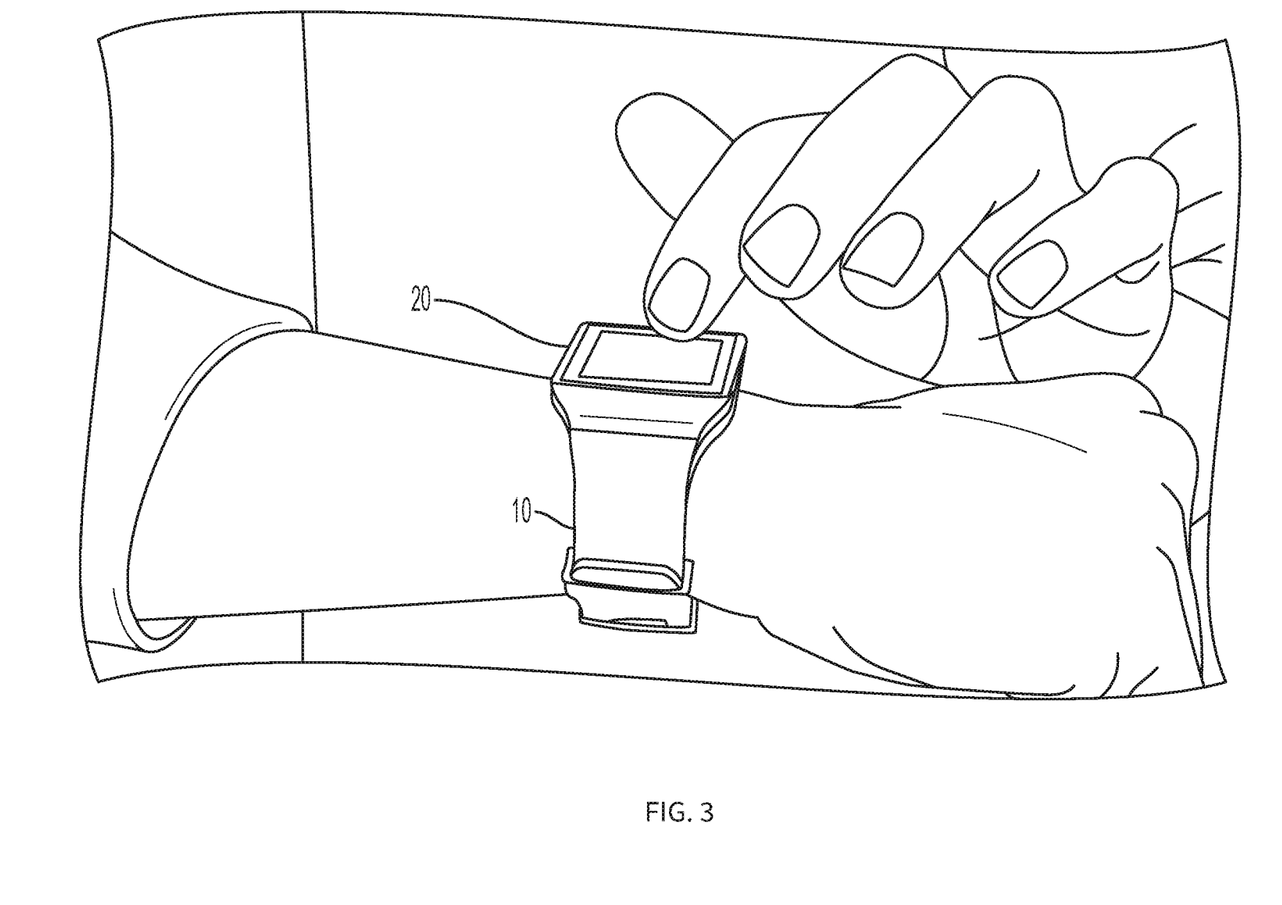
FIG. 3 depicts an interaction with a smartwatch.

FIG. 3 illustrates an interaction with a smartwatch 10. A user can interact with smartwatch 10 via a touch sensitive display area 20 to execute one or more applications associated with a smartwatch or use any other functionality associated with the smartwatch 10. However, when interacting with the smartwatch 10, portions of the user's fingers and/or hand can obstruct the viewing of portions of the display area 20. Accordingly, the user may find it difficult to fully utilize the smartwatch 10 in an efficient manner leading to additional time needed to effectuate the desired smartwatch functionality due to the obstruction of the small display area 20.

Figure 4:
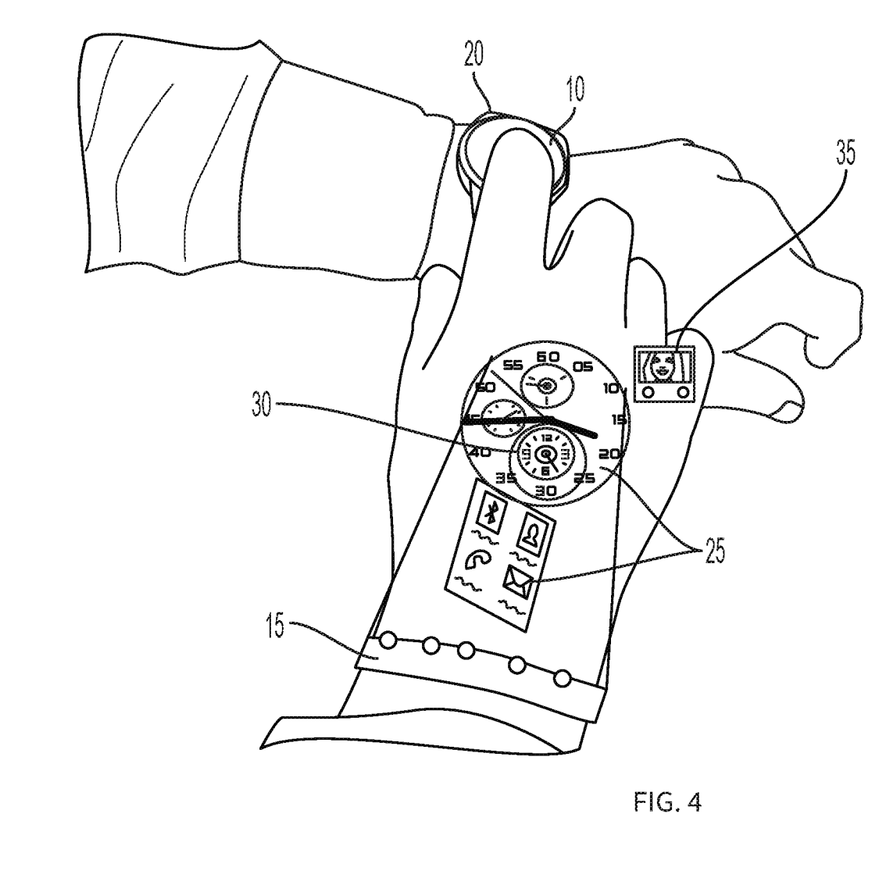
FIG. 4 depicts an interaction with a smartwatch and companion device according to one or more embodiments of the present invention.

FIG. 4 illustrates an interaction with smartwatch 10 and companion device 15 according to one or more embodiments of the invention. When interacting with the smartwatch 10, portions of the user's fingers and/or hand can obstruct the viewing of portions of the display area 20. The smartwatch 10 use sensors in the smartwatch 10, as well as sensors in the band of the smartwatch 10 to detect movements by the user when interacting with smartwatch 10. In addition, the smartwatch 10 may use a camera (not shown) to also capture gestures, which can be used to determine when and how the user is interacting with the smartwatch 10, for example, determining when portions of the user's fingers and/or hand obstruct the viewing of portions of the display area 20.

When the smartwatch 10 via the sensors and/or camera detects that at least a portion of the display area 20 is being obstructed, the smartwatch 10 can communicate with the companion device 15 to project content within the display area 20 of the smartwatch 10 onto a surface. The companion device 15 can include one or more pico-projectors attached to a band/bracelet. The exemplary illustration shows the display area 20 of the smartwatch 10 being projected onto a display space 25 on the user's opposing wrist/hand portion by the companion device 15. The display space 25 can provide a larger viewing area than the display area 20 associated with the smartwatch 10. The display space 25 can provide a better resolution than the resolution associated with the display area 20. Other variations of how the smartwatch 10 and companion device 15 is worn are also considered. For example, the smartwatch 10 and companion device 15 can be worn on the same wrist. In addition, the companion device 15 can also project display area 20 on other surfaces, for example, a wall, table, window or the like.

Moreover, when at least a portion of the display area 20 is being obstructed, the smartwatch 10 can be set to confirm that the obstruction has occurred consistently for a predetermined period of time (e.g., 1 second) before projecting content within the display area 20 of the smartwatch 10. The user may also set preferences for instances in which content should be projected when an obstruction is encountered.

The user can view interactions taking place on the display area 20 within the display space 25 projected by the companion device 15. The sensors and camera associated with the smartwatch 10 can be used to view a finger position 30 on the display area of the smartwatch 10 on the display space 25. When the display space 25 is projected on a surface other than the user's wrist/hand portion, the user can interact with the smartwatch 10 through the display space 25 projected by the companion device 15 to effectuate smartwatch 10 functionality, for example, phone calls, messages, etc. Moreover, the user can view content 35 on the display space 25 that has moved outside a physical boundary of the display area of the smartwatch 10.

The projected display space 25 can be displayed for a predetermined time period after the smartwatch 10 is no longer obstructed. In addition, the projected display space 25 can also be displayed for a predetermined time period when the smartwatch 10 is obstructed but the smartwatch 10 does not detect an interaction with the display area 20.

Figure 5:
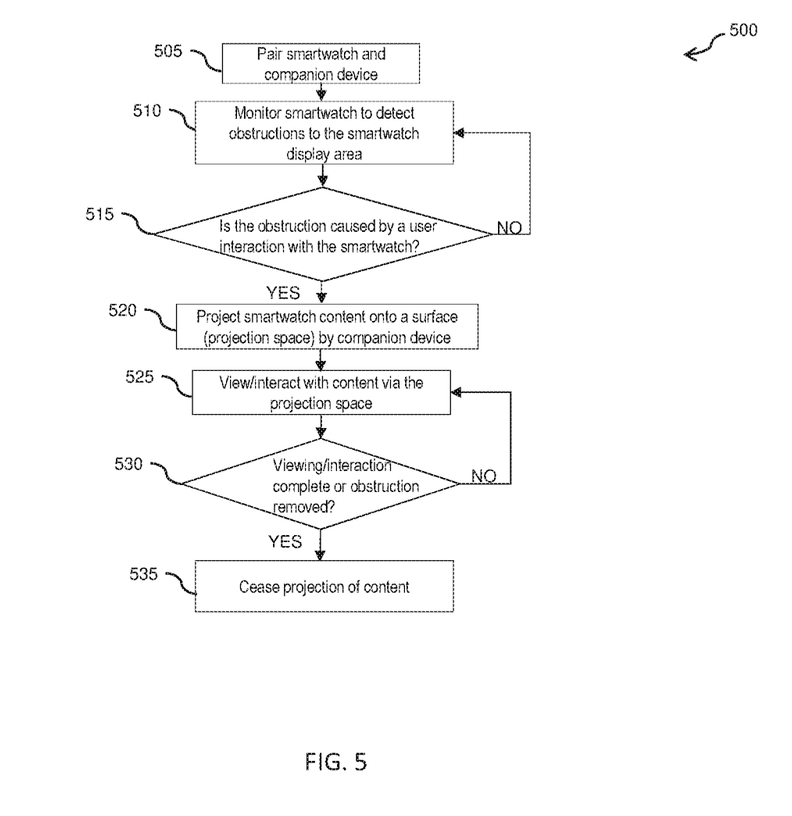
FIG. 5 is a flow diagram of a method for obstruction free smartwatch interactions according to one or more embodiments of the present invention.

Now referring to FIG. 5, a flow diagram of a method 500 for obstruction free smartwatch interactions in accordance with one or more embodiments of the present invention. At block 505, a smartwatch (e.g., smartwatch 10) can be paired with a companion device (e.g., companion device 15). The pairing of the smartwatch and companion device can occur using a variety of communication protocols, for example, Bluetooth.

At block 510, the smartwatch can monitor itself to detect obstructions to a display area of the smartwatch. For example, obstructions such as a user's finger, wrist or other body part may block the display area of the smartwatch. Other objects may also obstruct the display area of the smartwatch, for example, a shirt sleeve or the like.

At block 515, upon determining that an obstruction has been detected, the smartwatch can determine whether the obstruction is caused by the user attempting to interact with the smartwatch or if there is another reason for the obstruction. The smartwatch can use a variety of sensors and a camera to determine whether the obstruction is, for example, one or more fingers or a wrist, or another object (e.g., a shirt sleeve). If the obstruction is not in response to the user attempting to interact with the smartwatch, the method 500 will return to block 510.

At block 520, in response to a determination that the obstructed is due to the user attempting to interact with the smartwatch, the smartwatch can communicate with the companion device in order to project content within the display area of the smartwatch onto a surface (projection space). The surface can be a user's wrist/arm, table, wall or the like. The companion device can include one or more pico-projectors capable of projecting images and content communicated to the companion device by the smartwatch. The projection space can include a projection of images and content that is larger than the display area of the smartwatch. In addition, the projected images and content can have a better resolution than that of the display area of the smartwatch.

At block 525, the user can view interactions with the display area of the smartwatch via the projection space. Accordingly, the user can view obstructed portions of the display area in the projection space on the user's wrist/arm while interacting with the smartwatch. If the projection space is on a surface that is not the wrist/arm of the user, the user can interact with the projection space to execute functionality on the smartwatch via inputs received through the projection space.

At block 530, the method 500 can determine whether the user has completed a desired interaction on the smartwatch or the removal of the obstruction caused by at least a portion of the user's fingers or wrist. At block 535, in response to the user completing a desired activity on the smartwatch and removing the obstruction caused by at least a portion of the user's fingers or wrist, the companion device can cease projection of images and content associated with the display area of the smartwatch after a predetermined time period. If the user has not completed the desired activity on the smartwatch, the method 500 returns to block 525.

Accordingly, a system, a method, and/or computer program product is disclosed herein that address issues with obstructions when interacting with a smartwatch. The smartwatch can be paired with a wristband in which a user can wear the smartwatch on one arm and the wristband on another arm.

The smartwatch can include a camera, one or more proximity sensors and touch sensors installed in the smartwatch that can be used to identify if the user is interacting with the smartwatch and the user's opposing arm/hand is causing an obstruction. The wristband can have multiple pico-projectors installed.

Once the obstruction is detected, the smartwatch can communicate with the wristband to project the display area on an upper surface of the hand using the pico-projectors of the wristband. Based on the user's activity, the smartwatch can determine that the user is still interacting with the smartwatch and portions of the display area will continue to be obstructed, then the wristband can project the contents associated with the display area on the upper surface of the hand.

During an interaction with the smartwatch, if the user moves one or more apps/icons outside of the physical boundary of the smartwatch, the same will be projected outside of the boundary by the companion device. A touch sensor can be installed in the physical display area of the smartwatch that can identify a touch boundary on the display screen of the smartwatch and any projections by the wristband can be used by the user to determine a finger position within the physical display area of the smartwatch.

The user can also configure various actions associated with the smartwatch using an applied pressure on the display surface, by the user, which can engage a projected space produced by the companion device. Sensors installed in the smartwatch can identify an orientation of the hand with respect to the facial position of the user and can project the same, so that even if other hand moves, the projected content will be aligned with the orientation of the smartwatch.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for obstruction free smartwatch interactions, the method comprising:
    pairing, using a processor, a smartwatch and a companion device;
    detecting, using the processor, one or more obstructions to a display area of the smartwatch;
    determining, using the processor, that the one or more obstructions are caused by a user attempting to interact with the smartwatch;
    projecting content associated with the smartwatch onto a surface by the companion device in response to the one or more obstructions being caused by the user attempting to interact with the smartwatch; and
    receiving a first input at the smartwatch, wherein the projected content includes an indication of a location of the first input.

2. The computer-implemented method of claim 1, wherein the one or more obstructions is caused by at least a portion of a hand, fingers or arm of the user.

3. The computer-implemented method of claim 1, wherein the projection of content by the companion device is caused by one or more pico-projectors.

4. The computer-implemented method of claim 1, wherein one or more sensors are used to detect the one or more obstructions.

5. The computer-implemented method of claim 1, wherein a camera is used to detect the one or more obstructions.

6. The computer-implemented method of claim 1, further comprising ceasing the projection of content by the companion device in response to the one or more obstructions not being caused by the user attempting to interact with the smartwatch.

7. The computer-implemented method of claim 6, wherein the cessation of the projection occurs after a predetermined time period.

8. A computer program product, the computer program product comprising a computer readable storage medium having program instructions embodied therewith, the program instructions readable by a processing circuit to cause the processing circuit to perform a method comprising:
    pairing a smartwatch and a companion device;
    detecting one or more obstructions to a display area of the smartwatch;
    determining that the one or more obstructions are caused by a user attempting to interact with the smartwatch;
    projecting content associated with the smartwatch onto a surface by the companion device in response to the one or more obstructions being caused by the user attempting to interact with the smartwatch; and
    receiving a first input at the smartwatch, wherein the projected content includes an indication of a location of the first input.

9. The computer program product of claim 8, wherein the one or more obstructions is caused by at least a portion of a hand, fingers or arm of the user.

10. The computer program product of claim 8, wherein the projection of content by the companion device is caused by one or more pico-projectors.

11. The computer program product of claim 8, wherein one or more sensors are used to detect the one or more obstructions.

12. The computer program product of claim 8, wherein a camera is used to detect the one or more obstructions.

13. The computer program product of claim 8, further comprising ceasing the projection of content by the companion device in response to the one or more obstructions not being caused by the user attempting to interact with the smartwatch.

14. The computer program product of claim 13, wherein the cessation of the projection occurs after a predetermined time period.

15. A computer system, comprising:
    a processor in communication with one or more types of memory, the processor configured to:
    pair a smartwatch and a companion device;
    detect one or more obstructions to a display area of the smartwatch;
    determine that the one or more obstructions are caused by a user attempting to interact with the smartwatch;
    projecting content associated with the smartwatch onto a surface by the companion device in response to the one or more obstructions being caused by the user attempting to interact with the smartwatch; and
    receiving a first input at the smartwatch, wherein the projected content includes an indication of a location of the first input.

16. The computer system of claim 15, wherein the one or more obstructions is caused by at least a portion of a hand, fingers or arm of the user.

17. The computer system of claim 15, wherein the projection of content by the companion device is caused by one or more pico-projectors.

18. The computer system of claim 15, wherein one or more sensors are used to detect the one or more obstructions.

19. The computer system of claim 15, wherein a camera is used to detect the one or more obstructions.

20. The computer system of claim 15, further comprising ceasing the projection of content by the companion device in response to the one or more obstructions not being caused by the user attempting to interact with the smartwatch.

* * * * *